May 5, 1936.  W. R. OST ET AL  2,040,062
WELDING TORCH APPARATUS
Filed Oct. 29, 1932  2 Sheets-Sheet 2
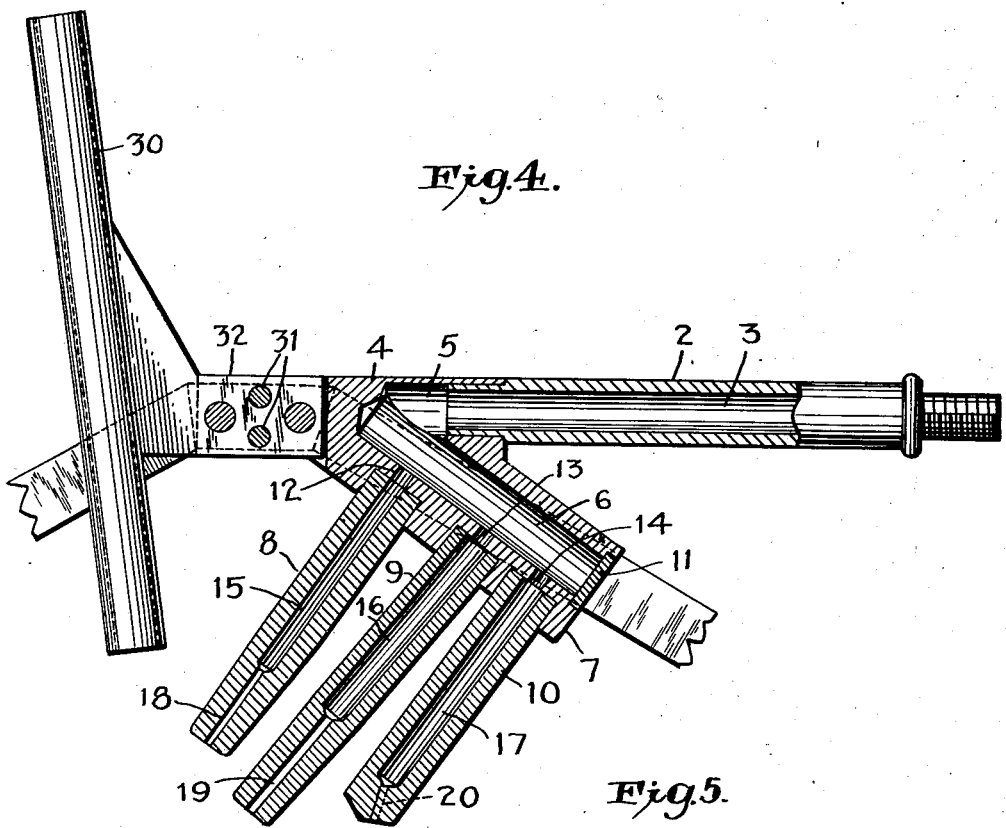
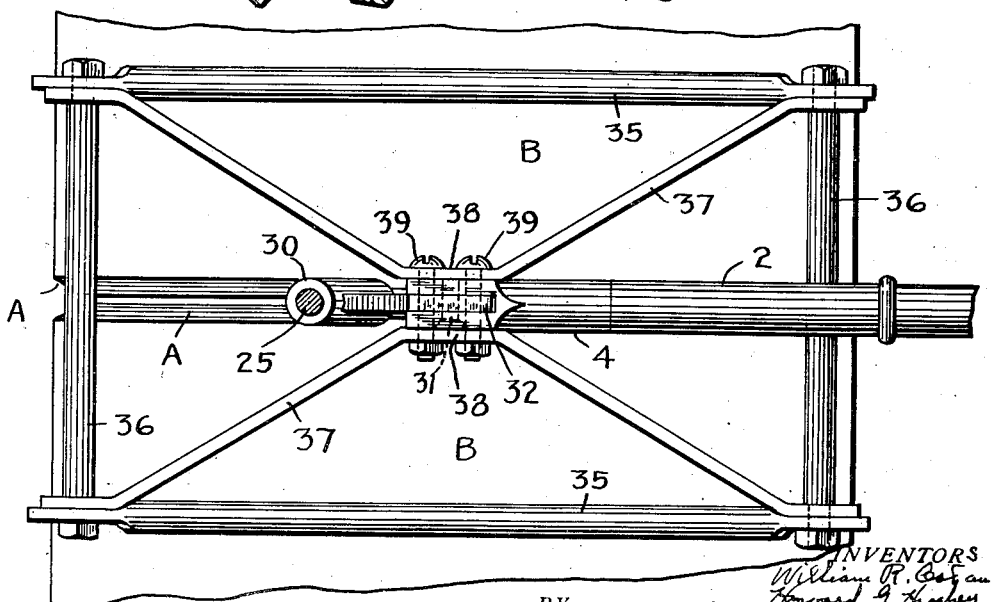

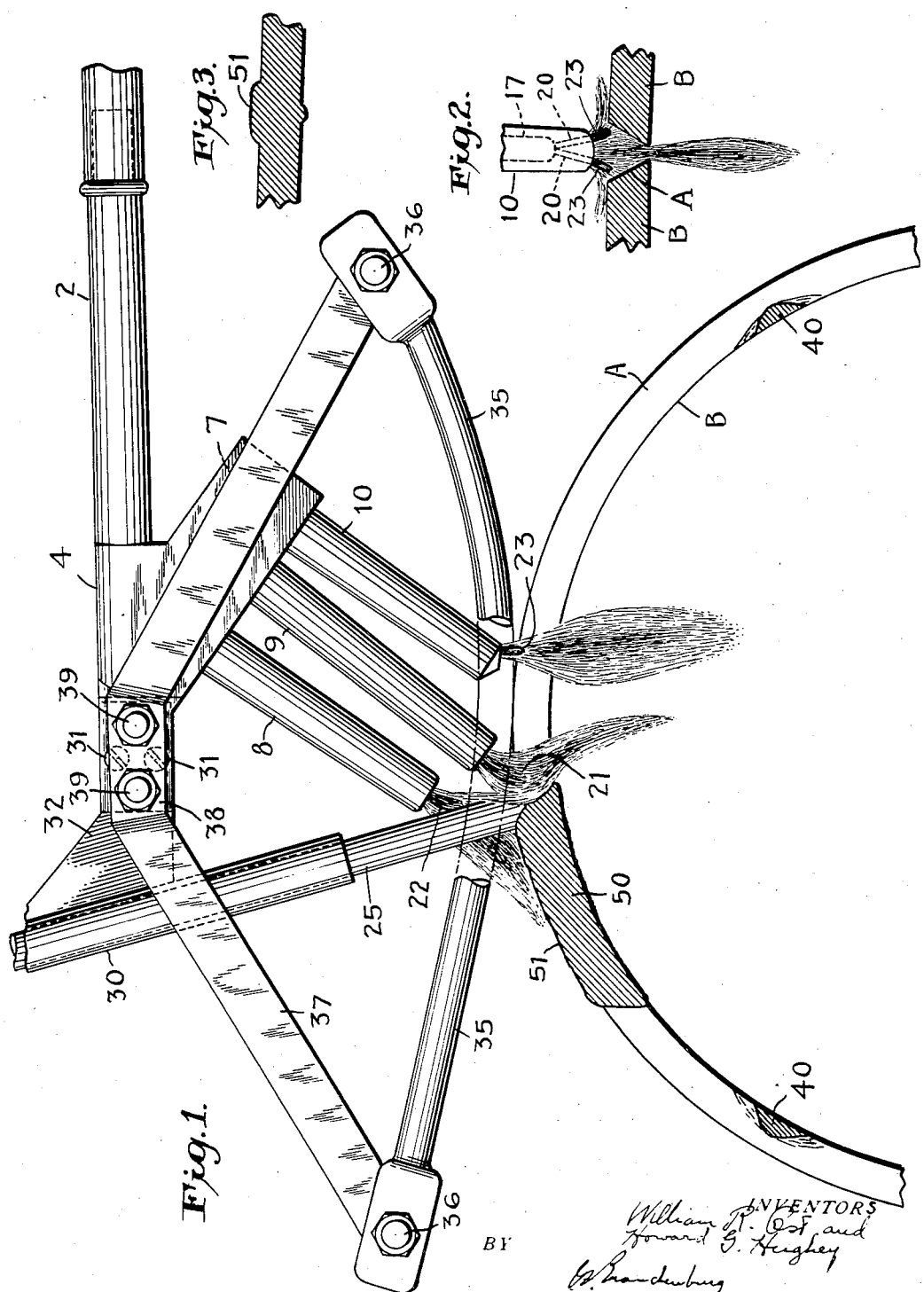

Patented May 5, 1936

2,040,062

UNITED STATES PATENT OFFICE 2,040,062

WELDING TORCH APPARATUS

William R. Ost, Verona, and Howard G. Hughey, Irvington, N. J., assignors to Air Reduction Company, Incorporated, New York, N. Y., a corporation of New York Application October 29, 1932, Serial No. 640,156

4 Claims. (Cl. 113—59)

This invention relates to oxyacetylene torch apparatus for welding seams between metal parts of plate thickness, for example thicknesses of ¼" to $\frac{1}{16}$". In this class of welding, the edges of the plate material must be prepared by beveling, so that when the edges are opposed a V is formed, into which metal is melted from a rod. The material may be either flat or curved, the particular operation illustrated herein being the welding together of the ends of pipe sections.

The object of the invention is to provide an improved apparatus with which sound welds can be made easily, without special skill on the part of the operator, and very rapidly and economically. The torch disclosed herein is an improvement on the welding apparatus covered by Patent No. 1,915,946, dated June 27, 1933. Objects in connection with our improved torch are to make the welding operation even more expeditious and economical, to secure better preheating of the sides of the V, to avoid any danger of blowing molten metal through the weld, and generally to increase the facility with which excellent welds are made. Another object is to provide a torch that can be readily manufactured.

Other objects are to provide a simple and serviceable support or shoe for holding the torch and a rod guide in definite relation to the seam, and to make the support readily removable from the torch and rod guide without disturbing the relations of the latter.

These and other objects and advantages of the invention will become apparent as the specification proceeds.

In the accompanying drawings, forming part hereof:

Fig. 1 is a side elevation of the preferred embodiment of the apparatus and a welding rod in use, the operation illustrated being the welding of a circular seam between two pipe sections, the body or handle of the torch being broken away, and a portion of one of the runners of the support also being broken out;

Fig. 2 is a cross-section at the region where the faces of the V are preheated, a portion of this tip element being shown in elevation;

Fig. 3 is a cross-section through the weld;

Fig. 4 is a view showing the tip part of the torch and its stem almost entirely in vertical longitudinal section, the rod guide in elevation, and portions of the shoe in elevation; and Fig. 5 is a top plan view of the apparatus on the pipe sections, the welding rod being shown in cross-section.

The torch has a stem 2 containing a mixing passage 3 through which the oxyacetylene mixture is conducted. The body of the torch with its handle and connections for receiving the oxygen and acetylene, and the mixer for introducing the gases to each other in proper proportions, have not been illustrated since these matters are familiar to those skilled in the art, and any suitable body and mixer may be employed. The tip or nozzle construction illustrated embodies novel features, the details of which may be varied. The preferred form will be described.

The front end of the tubular stem 2 is fixed in a socket of a simple tip block 4, and the entrance cavity or passage 5 of this block communicates with a header or distributor passage 6, which extends obliquely downward and rearward, at an acute angle to the passage 3. The resulting abrupt or reverse bend in the path of flow of the gas mixture promotes more perfect mixing, and the disposition of the header portion 7 of the tip block facilitates the application of nozzle elements 8, 9 and 10 in a grouping and relative arrangement advantageous for the purpose of the invention.

The end of the header passage 6 is closed by a plug 11, and ports 12, 13 and 14 in the under part of the header distribute the mixture to the respective nozzles.

Each of these nozzles is preferably formed with a longitudinal chamber passage 15, 16, or 17, the area of which is large in comparison with the outlet orifice area of the nozzle. The nozzles 8 and 9 preferably have a single orifice passage apiece, these passages being marked 18 and 19, whereas the nozzle 10 preferably has two or more outlet orifices 20. The middle nozzle 9 delivers the main welding flame 21, and its orifice 19 is preferably larger than the orifices of the nozzles 8 and 10, which deliver, respectively, a rod-preheating flame 22 and a plate-preheating flame 23.

The type of welding operation to be performed with this torch can be performed most easily and successfully if the ports and passages for the several nozzles are so proportioned that while the gas mixture emitted from the rod and plate preheating tips is at a high velocity, the gas from the central or welding tip is at a lower velocity. This relatively low velocity of the burning gas from the welding tip keeps molten metal from being blown through the weld and leaving undesirable projections on the under surface. In the particular construction illustrated the ports 12, 13 and 14 are of the same size, but the relatively large size of the welding flame orifice passage 19 insures the lower velocity of this flame. Naturally, the ports and passages may be designed in various ways to insure a moderate velocity for the welding flame.

The nozzles 8, 9 and 10, or their outlet orifices, are disposed in a special manner so that the respective flames are discharged at effective angles, and are well separated from each other to prevent mutual interference. The nozzle 9, or its passage, is arranged to project the welding flame 21 at a rearward inclination to the seam and full into the V A formed by the beveled edges of the parts B, B to be united. This V is shown in Figs. 2 and 5. This flame acts at the point where the lower end of the welding rod 25 rests and is melted into the V. The function of this flame is to melt filling metal from the rod into the V and to effect fusion between the weld and base metals.

The nozzle 8 terminates at a level above the end of the nozzle 9, and directs its flame rearward and downward against the rod 25, so as to preheat the latter and enable the flame to melt it more rapidly at the V.

The plate-preheating nozzle 10 may also be inclined rearwardly, but its orifices 20 are preferably so drilled that the flame 23 is directed very nearly perpendicularly or somewhat forwardly. This flame should be spaced a substantial distance, preferably on the order of about an inch or more, from the welding flame. The function of this flame is to preheat strongly the sides of the V, in order that the welding may proceed as rapidly as the rod can be fused into the groove, and that a strong and perfect union between the weld metal and the base metal may be effected notwithstanding the rapidity with which the weld is made. If the plate-preheating flame consisted of a single jet directed straight down into the V, there would be some tendency to melt away the bottom edges, with consequent danger that the molten metal would not be held in the groove at the region of fusion. Furthermore, the preheating of the sides of the V would be less effective and a substantial amount of this heat would be lost through the crevice. An improvement consists in splitting this flame up into two or more jets so disposed that heat is projected against the sides of the V, preferably at or near the top. As shown in Fig. 2, there are two of the jet passages 20 spaced in laterally divergent relation to apply the heat first to the upper portions of the faces of the V, the burning gas flowing downward over the faces and through the crevice in a manner to secure adequate and economical preheating of the plate metal, without detrimental melting at this region.

A holder 30 for the welding rod 25 is connected to or with the torch to guide the rod into the weld at the proper angle with relation to the flames and the seam. This guide or holder preferably comprises a tube through which the rod will settle by gravity as its lower end is melted into the weld. The guide is so disposed that the welding rod is fed downward at a forward inclination with respect to the direction of welding. It is preferably held in fixed relation to the torch by screws 31 which fasten a tongue 32 of the rod guide in a slot in the end of the tip block 7.

The torch and rod guide which have been described may be supported entirely by the hand of the operator, but a mechanical support which insures steadiness and a definite spacing of the tip structure with relation to the seam is naturally desirable. The apparatus shown in the drawings includes an advantageous supporting device for use with manual operation. This device includes two laterally spaced runners 35 to rest on the parts to be welded, at opposite sides of the seam and the torch, these runners being connected at their opposite ends by cross-rods 36, and being further braced and being connected to the torch by side frame members 37. Each of these frame members preferably consists of a bar, the ends of which are secured on the cross-rods 36 at the ends of one of the runners, each member being bent to form two limbs which incline upward and inward to a center attaching portion 38, these portions being secured to the sides of the tip block 7 by screws 39. By simply removing these screws the support or shoe can be separated from the torch and rod guide, without affecting the relations between the latter. With the cradle removed, the torch and rod guide may be mounted on any of the mechanically propelled supports, of which various kinds are known for welding or cutting.

Fig. 1 illustrates the welding together of two pipe sections. In such an operation, it is customary to tack the sections together preliminarily at a suitable number of points, as indicated at 40. The edges of the plates or pipe sections are beveled, as shown in Fig. 2, and the juxtaposition of these bevels forms a V, open at the bottom where a slot is left preparatory to welding. The welding is to be understood as proceeding from left to right in Fig. 1. In welding together pipe sections supported on rollers, it is customary to advance the torch and welding rod for a suitable distance along the seam, making a portion of the weld, whereupon an assistant turns the pipe sections backward through a small angle, this turning of the sections being repeated at intervals so that the welder works on or near the top until the circuit of the weld is completed. Manifestly, the torch and rod may be kept in one position in space while the pipe sections are turned at more or less constant speed. In Fig. 1 the direction of such rotation would be counterclockwise. Fig. 1 shows that a portion 50 of the weld has been made. At the region where the flame 21 and the rod 25 converge there is a body of molten metal melted by this flame. The welding flame also sweats the sides of the V, or may actually melt them to some extent, so that the added metal unites in an integral manner with the base metal. Owing to the manner in which the plate metal is preheated by the flame 23 and the rod by the flame 22, the welding proceeds with exceptional rapidity. The conditions insured by the apparatus are such that strong and uniform welds of good appearance are made easily. A substantially uniform, smooth bead 51 of metal (Fig. 3), providing ample reinforcement on the outside, is obtained. Thorough penetration is secured without undesirable projections on the inside. The molten metal flows forward in the slotted opening at the bottom of the V without falling through, and may form a slight bead on the inside, notwithstanding which the inner surface may be regarded as being substantially flush.

The gas mixture may be substantially neutral or may contain a slight excess of acetylene. It is desirable to rotate the welding rod about its axis as the weld progresses. This secures uniform heat distribution about the rod, obviates distribution of the metal and facilitates sticking or freezing of the rod in the V or in the deposited metal.

We claim:

1. An oxyacetylene welding torch for welding seams between plate metal parts, with addition of metal from a welding rod into the V between beveled edges of the parts, said torch having a tip part comprising three orifice portions adapted to deliver a large welding flame, a plate-preheating flame and a rod-preheating flame, respectively, the plate-preheating portion having a plurality of orifices arranged to direct jets toward the two sides and near the top of the V.

2. An oxyacetylene welding torch for welding seams between plate metal parts, with addition of metal from a welding rod into the V between beveled edges of the parts, said torch having a tip part comprising three orifice portions adapted to deliver a large welding flame, a plate-preheating flame and a rod-preheating flame, respectively, common means for supplying all said portions with the oxyacetylene mixture, the passages of the several portions being so balanced that the gases emitted from the welding flame portion are at lower velocity than the gases emitted from the other portions.

3. An oxyacetylene welding torch comprising a tubular stem for conducting the gas mixture, a tip block containing a header passage extending in acute angular relation reversely to said stem and having three ports, and three nozzles fed by said ports and extending from the under portion of the tip block in positions to deliver a welding flame, a plate-preheating flame, and a rod-preheating flame, respectively.

4. Welding apparatus, comprising a welding torch, a rod guide connected to said torch, a support to rest on the work and maintain the torch and rod guide in definite relation thereto, said support comprising two laterally spaced runners, cross-members connecting the forward and rearward portions of said runners, and side frame members the ends of which are connected with the forward and rearward portions of the runners, said side frame members having center attaching portions and limbs which incline upward and inward thereto, and means for detachably securing said center portions to the torch.

WILLIAM R. OST.
HOWARD G. HUGHEY.